United States Patent
Ito et al.

(10) Patent No.: US 6,486,620 B2
(45) Date of Patent: Nov. 26, 2002

(54) DISCHARGE LAMP LIGHTING CIRCUIT

(75) Inventors: Masayasu Ito; Hitoshi Takeda, both of Shizuoka (JP)

(73) Assignee: Koito Manufacturing, Tokyo (JP)

( * ) Notice: Subject to any disclaimer, the term of this patent is extended or adjusted under 35 U.S.C. 154(b) by 0 days.

(21) Appl. No.: 09/790,369

(22) Filed: Feb. 22, 2001

(65) Prior Publication Data
US 2001/0017525 A1 Aug. 30, 2001

(30) Foreign Application Priority Data
Feb. 25, 2000 (JP) ........................................ 2000-049364

(51) Int. Cl.[7] ................................................ G05F 1/00
(52) U.S. Cl. ...................... 315/308; 315/291; 315/289; 315/224; 315/360; 315/82; 315/DIG. 5
(58) Field of Search ............................. 315/209 R, 289, 315/282, 291, 307, 308, 224, 128, 360, 362, DIG. 5, DIG. 7, 82

(56) References Cited

U.S. PATENT DOCUMENTS

| | | | |
|---|---|---|---|
| 5,068,570 A | * 11/1991 | Oda et al. .................. | 315/119 |
| 5,365,152 A | * 11/1994 | Ozawa et al. ............... | 315/127 |
| 5,486,740 A | 1/1996 | Yamashita et al. .......... | 315/308 |
| 5,705,898 A | 1/1998 | Yamashita et al. .......... | 315/308 |

* cited by examiner

Primary Examiner—Haissa Philogene
(74) Attorney, Agent, or Firm—Fish & Richardson P.C.

(57) ABSTRACT

A discharge lamp lighting circuit 1 has a DC power supply circuit 3 for outputting a DC voltage, a DC-AC conversion circuit 4 for converting the output voltage of the DC power supply circuit into an AC voltage and then supplying the AC voltage to a discharge lamp 6, and a current detection circuit 8 for detecting an electric current flowing into the discharge lamp. Just after the discharge lamp 6 is lighted, the output frequency of the DC-AC conversion circuit 4 is temporarily changed for defining the lighting frequency of the discharge lamp as a low frequency, to perform DC lighting over a predetermined time. A control circuit 7 determines the duration of the DC lighting by the time it takes for the product of the time and the value of current flowing into the discharge lamp 6 to equal a predetermined value.

8 Claims, 10 Drawing Sheets

DISCHARGE LAMP LIGHTING CIRCUIT

TECHNICAL FIELD OF THE INVENTION

This invention relates to guaranteeing stable lighting of a discharge lamp and preventing degradation and short life of the discharge lamp in a discharge lamp lighting circuit adapted to perform DC lighting over a predetermined time. The lamp lighting circuit temporarily defines the lighting frequency of the discharge lamp as low frequency just after the discharge lamp is lighted.

BACKGROUND OF THE INVENTION

The configuration of a lighting circuit of a discharge lamp, such as a metal halide lamp, including a DC power supply circuit, a DC-AC conversion circuit, and a starter circuit is known. For example, in the configuration wherein a DC-DC converter is used as a DC power supply circuit, and a full-bridge type circuit comprising two pairs of semiconductor switch elements for performing switching control, and a driver circuit thereof are used for a DC-AC conversion circuit, the positive-polarity (or negative-polarity) voltage output by the DC-DC converter is converted into rectangular-wave voltage in the full-bridge type circuit, then this voltage is supplied to a discharge lamp.

In order to light a discharge lamp more reliably at the starting time of the discharge lamp, preferably a period of temporarily supplying low-frequency voltage (so-called DC lighting period) is provided and alternating voltage of a stipulated frequency is supplied after the discharge lamp is lighted, rather than abruptly supplying voltage of a stipulated frequency just after the discharge lamp is lighted. To do this, a predetermined time is set as the duration of the period by a timer circuit or the like.

However, the state at the lighting time of the discharge lamp varies from starting the discharge lamp in a cold state to starting the discharge lamp in a warm state, and if the duration of the DC lighting period is defined evenly, variations in the start properties of discharge lamps occur or an excessive thermal stress is placed on the electrode of a discharge lamp; this is a problem.

It would therefore be desirable to guarantee stable lighting of a discharge lamp and prevent degradation and short life of the discharge lamp in a discharge lamp lighting circuit.

SUMMARY OF THE INVENTION

Provided is a discharge lamp lighting circuit comprising a DC power supply circuit for outputting a DC voltage, a DC-AC conversion circuit for converting the output voltage of the DC power supply circuit into an AC voltage and then supplying the AC voltage to a discharge lamp, and a current detection circuit for detecting an electric current flowing into the discharge lamp. Just after the discharge lamp is lighted, the output frequency of the DC-AC conversion circuit is temporarily changed for defining the lighting frequency of the discharge lamp as a low frequency, thereby performing DC lighting over a predetermined time. The duration of the DC lighting is determined by the time it takes for the product of the time and the value of current flowing into the discharge lamp to equal a predetermined value.

Therefore, according to the invention, the duration of the DC lighting is determined by the time it takes for the product of the time and the value of current flowing into the discharge lamp to equal the predetermined value. For example, when the current value of the discharge lamp is large, then the duration of the DC lighting is shortened; when the current value is small, then the duration is prolonged, so that the stability of lighting can be guaranteed in response to the state of the discharge lamp. Such operation prevents degradation and short life of the discharge lamp.

DETAILED DESCRIPTION

Figure 1:
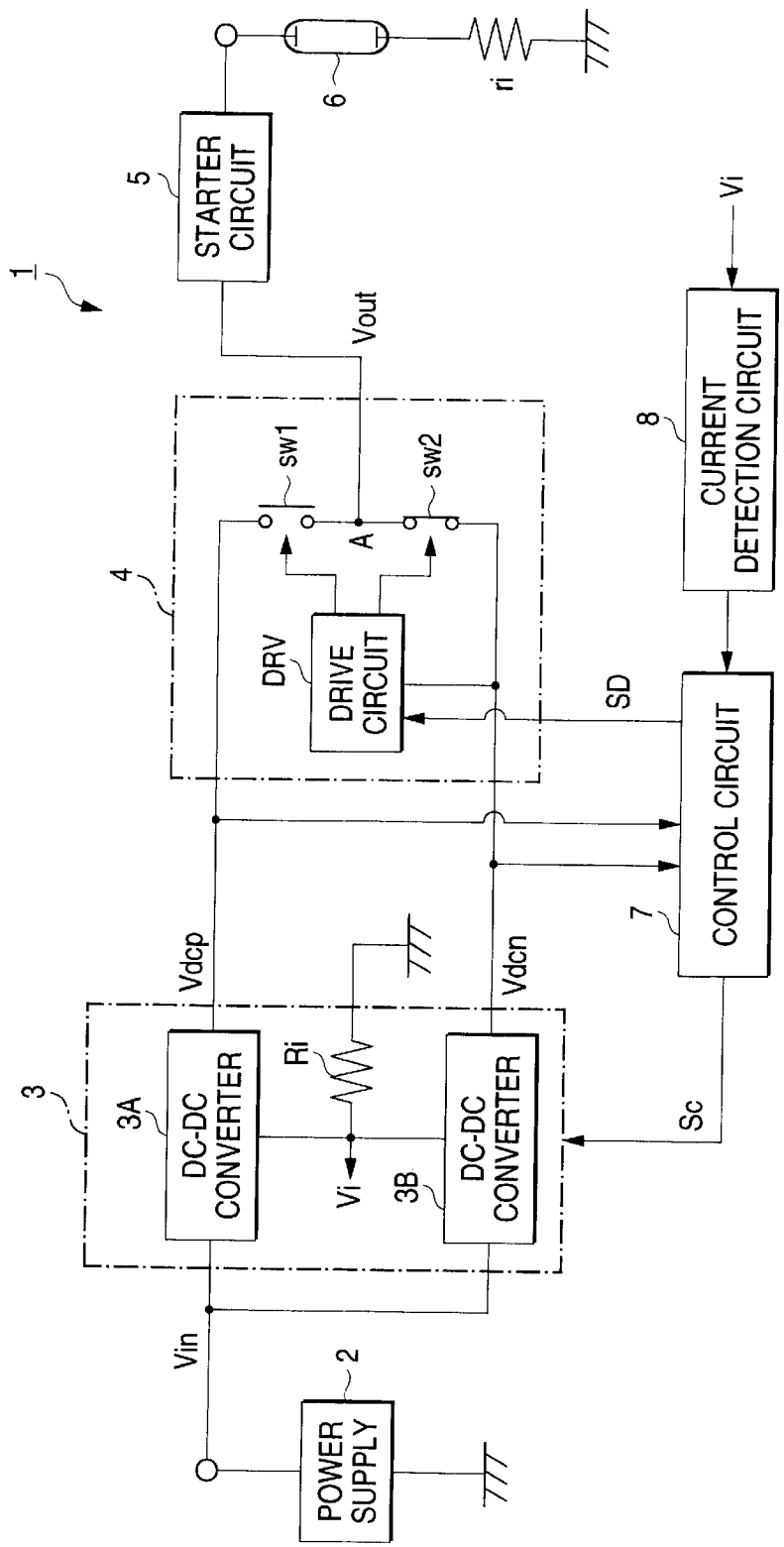
FIG. 1 is a circuit block diagram to show the basic configuration of a discharge lamp lighting circuit according to the invention.

FIG. 1 shows the basic configuration of a discharge lamp lighting circuit according to the invention; it shows the circuit configuration concerning one discharge lamp. A discharge lamp lighting circuit 1 comprises a power supply 2, a DC power supply circuit 3, a DC-AC conversion circuit 4, and a starter circuit 5.

The DC power supply circuit 3 receives DC input voltage (Vin) from the power supply 2 and outputs any desired DC voltage. The output voltage is variable-controlled in response to a control signal from a control circuit 7. The DC power supply circuit 3 uses DC-DC converters each having the configuration of a switching regulator (chopper type, flyback type, etc.,); a first circuit part (DCDC converter 3A) for providing positive-polarity voltage output (positive voltage output) and a second circuit part (DC-DC converter 3B) for providing negative-polarity voltage output (negative voltage output) are placed in parallel with each other.

Figure 2:
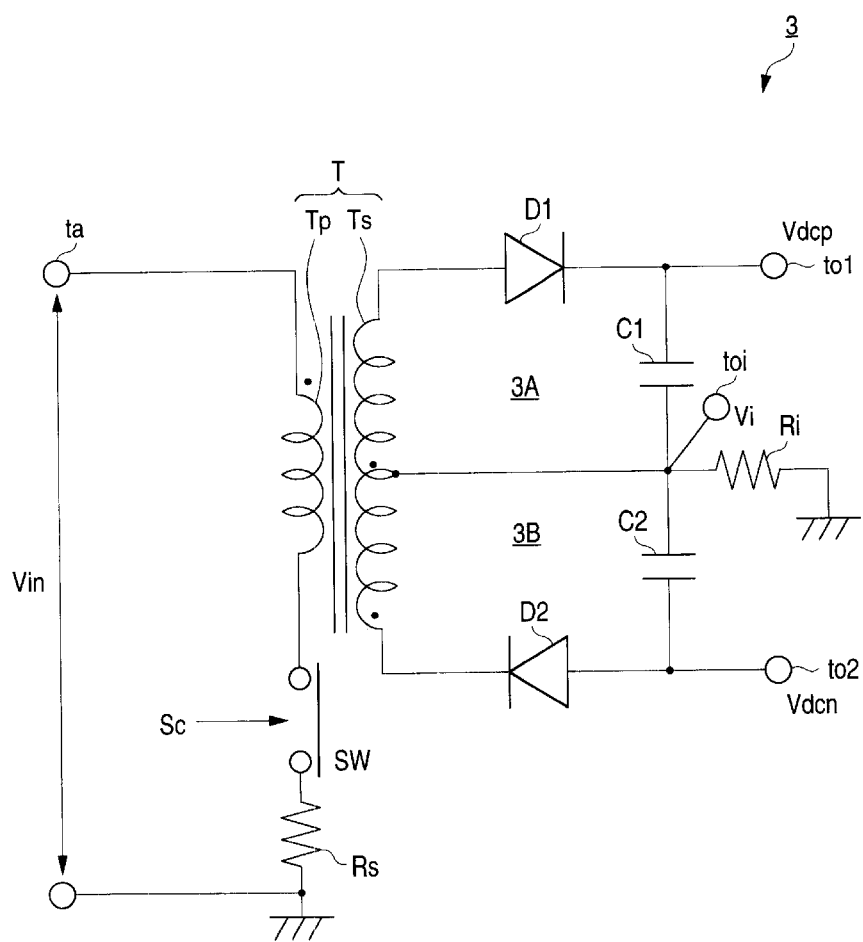
FIG. 2 is a circuit diagram to show a configuration example of a DC power supply circuit.
Figure 3:
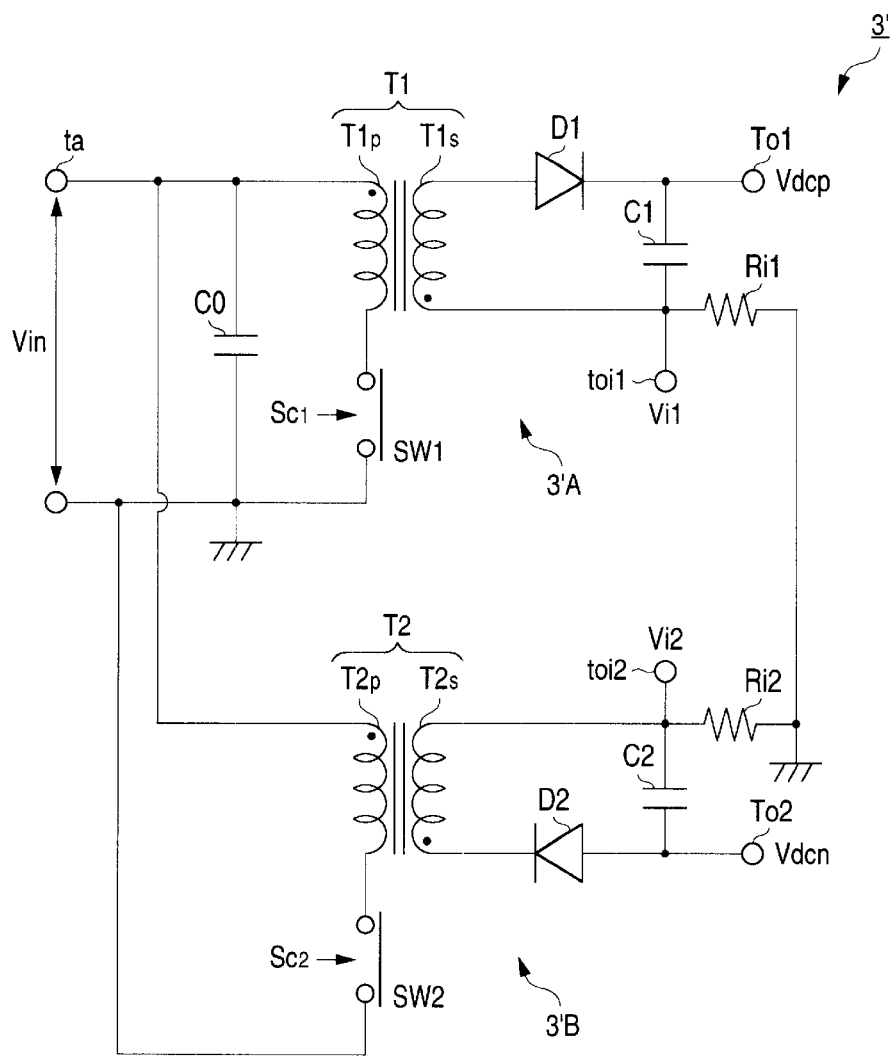
FIG. 3 is a circuit diagram to show another configuration example of a DC power supply circuit.

FIGS. 2 and 3 show configuration examples of the DC power supply circuit 3.

In the example shown in FIG. 2, a primary winding Tp of a transformer T is connected at one end to a DC input terminal ta, whereby the voltage Vin is input. The primary winding Tp is grounded at an opposite end via a semiconductor switch element SW (simply indicated by a switch symbol in the figure; a FET (field-effect transistor) or the like may be used) and a current detection resistor Rs, which is arbitrary and need not necessarily be provided. A signal Sc from the control circuit 7 is supplied to a control terminal of the semiconductor switch element SW (a gate if the switch element SW is an FET) for performing switching control of the semiconductor switch element SW.

A secondary winding Ts of the transformer T is connected at one end to an anode of a diode D1 and a cathode of the diode D1 is connected to one end of a capacitor C1 and is also connected to a terminal to1 from which output voltage (Vdcp) is provided. An opposite end of the capacitor C1 is connected to an intermediate tap of the secondary winding Ts and is grounded via a resistor Ri.

The secondary winding Ts is connected at an opposite end to a cathode of a diode D2 and an anode of the diode D2 is grounded via a capacitor C2 and the resistor Ri and is connected to a terminal to2. Output voltage (Vdcn) is provided through the terminal to2.

The resistor Ri is a current detection element for providing a detection signal concerning an electric current flowing into a discharge lamp 6, and voltage conversion of the current flowing into the resistor Ri is performed, thereby executing current detection. A detection terminal toi is connected to the connection point of the resistor Ri and the capacitors C1 and C2 and a detection signal Vi is provided from the detection terminal toi.

As described above, the DC power supply circuit 3 outputs the positive-polarity voltage Vdcp and the negative-polarity voltage Vdcn separately from the two output terminals to1 and to2.

The "." mark added to each winding of the transformer T denotes a winding start point. For example, the "." mark is added to the connection end to the diode D2, and to the winding start end at an intermediate tap.

A DC power supply circuit 3' shown in FIG. 3 comprises two transformers Ti (primary winding T1p and secondary winding T1s) and T2 (primary winding T2p and secondary winding T2s).

The primary windings T1p and T2p of the transformers are connected at one terminal to a DC input terminal ta and are grounded at an opposite end via switch elements SW1 and SW2 (simply indicated by switch symbols in the figure, although field-effect transistors may be used). The switch elements SW1 and SW2 are controlled separately by control signals Sc1 and Sc2 from the control circuit (7), whereby each secondary output can be variable-controlled independently.

A capacitor C0 placed parallel with the primary windings T1p and T2p is connected at one end to the DC input terminal ta and is grounded at an opposite end.

A DC-DC converter 3'A contains the transformer T1, the switch element SW1, and a rectification diode D1, a smoothing capacitor C1, and a current detection resistor Ri1 connected to the secondary winding T1s. That is, the secondary winding T1s is connected at one end to an anode of the diode D1 and a cathode of the diode D1 is connected to an output terminal to1 and one end of the capacitor C1. The capacitor C1 is connected at an opposite end to a winding start end terminal of the secondary winding T1s and is grounded via the current detection resistor Ri1.

Thus, in the circuit section, the current flowing into the primary winding T1p of the transformer Ti is controlled by turning the switch element SW1 on and off based on the control signal Sc1, and a positive-polarity voltage Vdcp is provided at the output terminal to1 through the diode D1 and the capacitor C1 from the secondary winding T1s. A terminal toi1 is a current detection terminal connected to the connection point of the capacitor C1 and the current detection resistor Ri1 and a detection signal Vi1 is provided from the terminal toi1.

A DC-DC converter 3'B includes the transformer T2, the switch element SW2, a rectification diode D2, a smoothing capacitor C2, and a current detection resistor Ri2 connected to the secondary winding T2s. That is, the secondary winding T2s is connected at one end (winding start end terminal) to a cathode of the diode D2 and an anode of the diode D2 is connected to an output terminal to2 and one end of the capacitor C2. The capacitor C2 is connected at an opposite end to a winding termination end terminal of the secondary winding T2s and is grounded via the current detection resistor Ri2.

Thus, in the circuit section 3'B, the current flowing into the primary winding T2p of the transformer T2 is controlled by turning the switch element SW2 on and off based on the control signal Sc2, and Vdcn is provided at the output terminal to2 through the diode D2 and the capacitor C2 from the secondary winding T2s. A terminal toi2 is a current detection terminal connected to the connection point of the capacitor C2 and the current detection resistor Ri2 and a detection signal Vi2 is provided from the terminal toi2.

Referring again to FIG. 1, a DC-AC conversion circuit 4 placed at the stage following the DC power supply circuit 3 converts the output voltage of the DC power supply circuit 3 into AC voltage and then supplies the AC voltage to a discharge lamp 6. The positive-polarity voltage and the negative-polarity voltage are sent separately from the two output terminals of the DC power supply circuit 3 to the DC-AC conversion circuit 4. To switch the output voltage Vdcp of the DC-DC converter 3A and the output voltage Vdcn of the DC-DC converter 3B, a pair of semiconductor switch elements sw1 and sw2 (simply indicated by switch symbols in the figure, although field-effect transistors and the like may be used as the switch elements) provided in the DC-AC conversion circuit 4 is operated alternately by a drive circuit DRV. The AC voltage generated by the alternation operation is supplied to the discharge lamp 6.

In particular, one of the two switch elements sw1 and sw2 connected in series at the output stage of the DC power supply circuit 3, sw1, is connected to the output terminal of the DC-DC converter 3A and also to the output terminal of the DC-DC converter 3B via sw2. For example, an IC (integrated circuit) known as a half-bridge driver may be used as the drive circuit DRV for performing switching control of the switch elements reciprocally. That is, the half bridge alternating operation is performed so that when the element sw1 is on, the element sw2 is turned off, and that when the element sw1 is off, the element sw2 is turned on, based on signals supplied to the control terminals of the switch elements from the drive circuit DRV, whereby the DC voltage is converted into an AC voltage.

Figure 4:
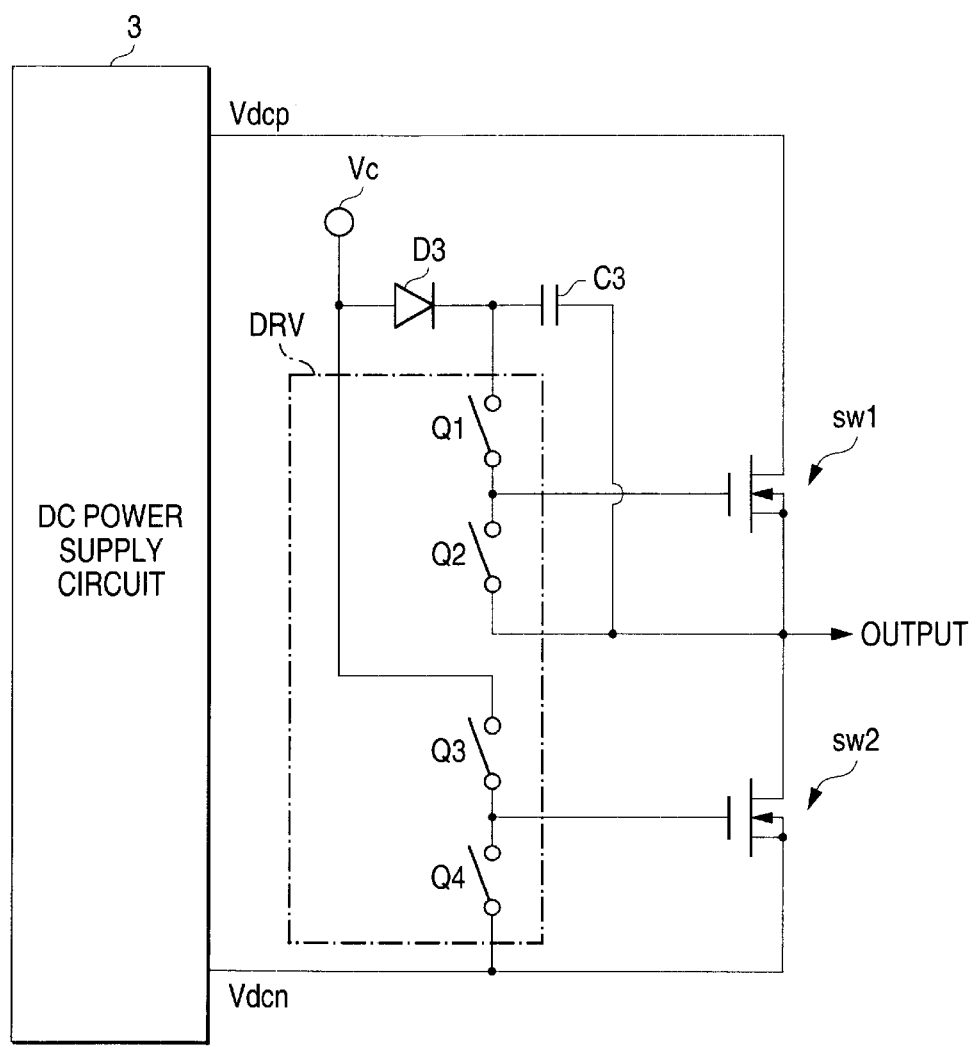
FIG. 4 is a drawing illustrating the configuration of a boot strap type drive circuit.

FIG. 4 shows a configuration example of a bootstrap type drive circuit wherein field effect transistors are used as the elements sw1 and sw2.

A configuration comprising a series circuit of two elements Q1 and Q2 and a series circuit of two elements Q3 and Q4 can be named as switching elements in a drive IC, and are indicated by switch symbols equivalently in FIG. 4.

Power is supplied to the elements Q1 to Q4 from a power supply terminal Vc; power is supplied to the elements Q1 and Q2 via a diode D3 from the power supply terminal Vc and power is supplied to the elements Q3 and Q4 directly from the power supply terminal Vc. For example, a cathode of the diode D3 is connected via a capacitor C3 to the connection points of n-channel FET's sw1 and sw2, and is also connected to the element Q1. The connection point of the elements Q1 and Q2 is connected to a gate of the FET sw1 and a terminal of the element Q2 opposite to the connection point to the element Q1 is connected to the connection point of the FET sw1 and sw2.

On the other hand, the element Q3 is connected at one end to the power supply terminal Vc and the connection point of the elements Q3 and Q4 is connected to a gate of the FET sw2 and a terminal of the element Q4 opposite to the connection point to the element Q3 is connected to a source of the FET sw2.

The elements Q1 to Q4 are controlled by control signals supplied to the DRV IC from the control circuit (not shown).

In the drive circuit, for example, to turn on the FET sw1 positioned above the FET sw2 in the figure, it is necessary to charge the capacitor C3 via the diode D3 from the power supply terminal Vc and use the charges to turn on the FET sw1 (the element Q1 is turned on and the element Q2 is turned off. At this time, to turn off the FET sw2 below the FET sw1 in the figure, the element Q3 may be turned off and the element Q4 may be turned on).

Referring again to FIG. 1, the starter circuit 5 generates a start high-voltage signal (start pulse) at the beginning of lighting the discharge lamp 6 for starting the discharge lamp 6. The start signal is superimposed on AC voltage Vout output by the DC-AC conversion circuit 4 and is applied to the discharge lamp 6. That is, the starter circuit 5 contains an inductive load (inductance component of a secondary winding, for example, of a trigger transformer) and the discharge lamp 6 is connected at one electrode terminal to a connection point A of the switch elements sw1 and sw2 via the inductive load and connected at the other electrode terminal directly to ground (GND), or to ground (GND) via a current detection resistor ri (if the current detection resistor shown in FIGS. 2 or 3 is not provided).

In FIG. 1, in addition to a current detection circuit 8 for detecting an electric current flowing into the discharge lamp by the current detection resistor Ri or ri, a voltage detection circuit for detecting the tube voltage of the discharge lamp or its equivalent voltage can be named as a detection circuit for detecting voltage or current related to the discharge lamp 6. As an example of the latter, a voltage detection means (for example, a circuit for detecting output voltage using a partial pressure resister or the like) is placed immediately following each of the DC-DC converters 3A and 3B that form the DC power supply circuit 3. A detection signal of the output voltage (Vdcp, Vdcn) detected by the voltage detection means can be used as an alternative signal to a voltage detection signal related to the discharge lamp 6.

Figure 5:
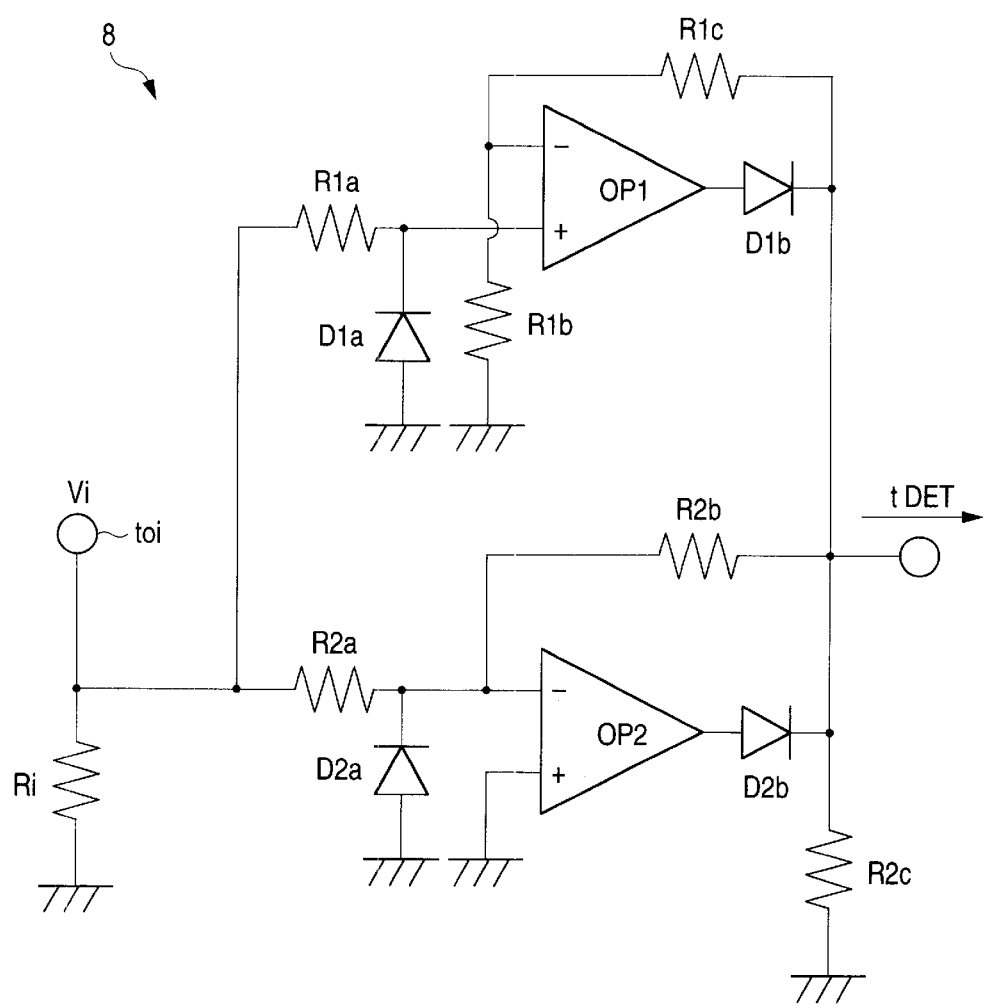
FIG. 5 is a circuit diagram showing a configuration example of a current detection circuit.

FIG. 5 shows an example of an implementation of a current detection circuit 8, wherein a non-inverting amplification circuit and an inverting amplification circuit are placed in parallel. A voltage drop caused by the current detection resistor Ri and the output voltage of the non-inverting amplification circuit or the inverting amplification circuit is selectively output.

In FIG. 5, an operational amplifier OP1 implements the non-inverting amplification circuit and has a non-inverting input terminal connected via a resistor Ria to the above-mentioned detection terminal toi (the connection point of the current detection resistor Ri and the smoothing capacitors C1 and C2). A diode D1a has a cathode connected to the non-inverting input terminal of the operational amplifier OP1 and an anode grounded. The diode D1a and a diode D2a (described later) are added for the purpose of protecting the operational amplifier when the input voltage to the operational amplifier is inverted to a negative value.

The operational amplifier OP1 has an output terminal connected to an anode of a diode D1b and a cathode of the diode D1b is connected to a current detection output terminal tDET and is grounded via an R2c. The non-inverting input terminal of the operational amplifier OP1 is grounded via a resistor R1b and is connected to the cathode of the diode D1b via a resistor R1c. The resistance values of the resistors R1a, R1b, and R1c are set to the same value.

An operational amplifier OP2 implements the inverting amplification circuit and has an inverting input terminal connected to the detection terminal toi via a resistor R2a. A diode D2a has a cathode connected to the inverting input terminal of the operational amplifier OP2 and an anode grounded.

The operational amplifier OP2 has an output terminal connected to an anode of a diode D2b and a cathode of the diode D2b is connected to the current detection output terminal tDET and is grounded via a resistor R2c. The inverting input terminal of the operational amplifier OP2 is connected to the cathode of the diode D2b via a resistor R2b (the resistance value of the resistor R2b is set to twice that of the resistor R2a). A non-inverting input terminal of the operational amplifier OP2 is grounded.

In the circuit, the voltage drop component caused by the current detection resistor Ri is amplified to twice the voltage by the non-inverting amplification circuit of the operational amplifier OP1. Conversely, the voltage drop component is amplified to "−2" X voltage by the inverting amplification circuit of the operational amplifier OP2. Either of the voltages, whichever is higher, is selected by the diodes D1b and D2b placed at the output terminals of the operational amplifiers, and is output to the current detection output terminal tDET. That is, when the supply voltage to the discharge lamp 6 has a negative polarity, the output voltage of the non-inverting amplification circuit of the operational amplifier OP1 is provided at the current detection output terminal tDET, and when the supply voltage to the discharge lamp 6 has a positive polarity, the output voltage of the inverting amplification circuit of the operational amplifier OP2 is provided at the current detection terminal tDET. The detection voltage thus provided is used as a signal to determine whether or not the discharge lamp 6 is lighted, a signal to determine the light state of the discharge lamp 6 and define the supply power, or the like.

Referring again to FIG. 1, the control circuit 7 (see FIG. 1) is provided for controlling voltage, current, or supply power of the discharge lamp 6 in response to the state detection signal of the discharge lamp 6 containing the detection signal from the current detection circuit 8. It sends a control signal (Sc) to the DC power supply circuit 3, thereby controlling the output voltage, or sends a control signal (SD) to the drive circuit DRV for controlling polarity switching of the bridge. The control circuit 7 also performs output control to reliably light the discharge lamp 6 by raising the supply voltage to the discharge lamp 6 to one level before the discharge lamp 6 is illuminated.

Just after the discharge lamp 6 is illuminated, the output frequency of the DC-AC conversion circuit 4 is temporarily changed by the control signal sent from the control circuit 7 to the drive circuit DRV for defining the lighting frequency of the discharge lamp 6 as low frequency, thereby performing DC lighting (or DC voltage supply) over a predetermined time. At the time, it becomes necessary for the control circuit 7 to determine how long the DC lighting is continued upon reception of the signal from the current detection circuit 8; the control circuit 7 controls so that the product of current and time becomes a constant. That is, the duration of the DC lighting is determined by how long it takes until the product of the time and the value of current flowing into the discharge lamp 6 reaches a predetermined value, and the current and the time (the duration of the DC lighting) are inversely proportional to each other. Thus, for example, when the value of current flowing into the discharge lamp 6 is large, the duration of the DC lighting is shortened; when the current value is small, the duration of the DC lighting is prolonged.

Figure 6:
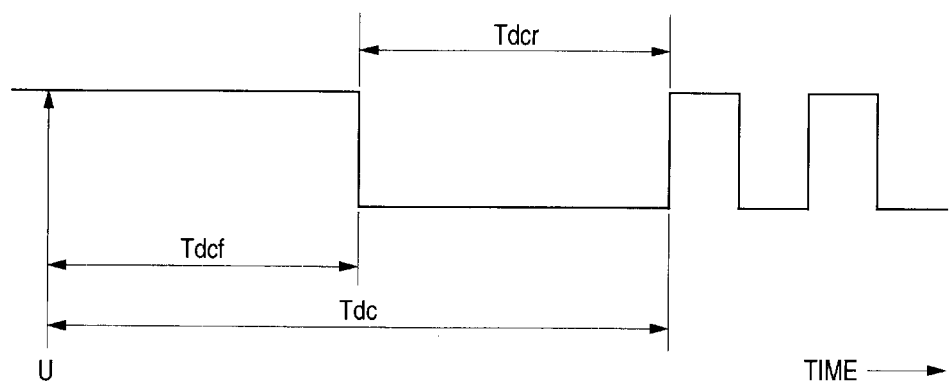
FIG. 6 is a drawing schematically showing rectangular-wave voltage supplied to a discharge lamp.

FIG. 6 schematically shows a rectangular-wave voltage supplied to the discharge lamp 6. It shows the state of making the transition to the defined lighting frequency after DC lighting over the period Tdc (Tdcf means the first half of the period and Tdcr means the latter half) assuming that the discharge lamp 6 is lighted at the time indicated by the arrow U.

In the control, the duration of the period Tdc varies depending on the magnitude of the current value.

The greater the setup value of the product of the current value (I) and the time (t) (=I×t), the better the lighting performance of the discharge lamp. However, there is concern that the discharge state may become unstable just after the discharge lamp is lighted, thus care must be taken in setting the product value. If the duration of the DC lighting is too long, consideration should also be given to placing a thermal stress on the electrode of the discharge lamp, leading to short life of the discharge lamp.

For example, assume that I×t=30 (A×mS) where A denotes amperes and mS denotes milliseconds. If the value of current flowing into the discharge lamp is 2 A, the duration of the DC lighting period (corresponding to the period until the polarity of the output voltage of the DC-AC conversion circuit is first changed) becomes 15 mS. If the power supply capability of the lighting circuit is degraded because of lowering the power supply voltage, for example, and the value of current flowing into the discharge lamp becomes 1.2 A, the duration is then prolonged to 25 mS. The state of the discharge lamp is thus determined based on the current value and the polarity change timing related to the output voltage of the DC-AC conversion circuit as controlled (namely, the smaller the current value, the more delayed the polarity change timing), whereby the frequency of turning off the discharge lamp can be decreased.

In addition, when the value of current flowing into the discharge lamp is small, an inconvenience occurs and thus a solution to the problem is required.

For example, the discharge lamp is warm for a while after it is turned off, and the case where the discharge lamp is turned on in this state is assumed.

Assuming that the value of current flowing into the discharge lamp is 0.3 A at the time, the duration of DC lighting becomes 100 mS according to the setup value of the product of the current and time, and this is a considerably long duration. It does not noticeably affect the life of the discharge lamp, but is disadvantageous to costs if a bootstrap type circuit configuration as shown in FIG. 4 is adopted, for example.

That is, in the system of FIG. 4, if the capacitor C3 loses its charge, or the charge amount becomes insufficient, it becomes impossible to maintain the upper stage FET to be on. Leakage of the gate of the FET, and leakage in the bridge drive circuit or the like, can be named as the cause of such a situation, and it is difficult to suppress to zero amperes. Thus, it becomes necessary to set a larger capacitance value for the capacitor C3 because the time of maintaining the FET on is prolonged, causing a rise in costs.

Figure 7:
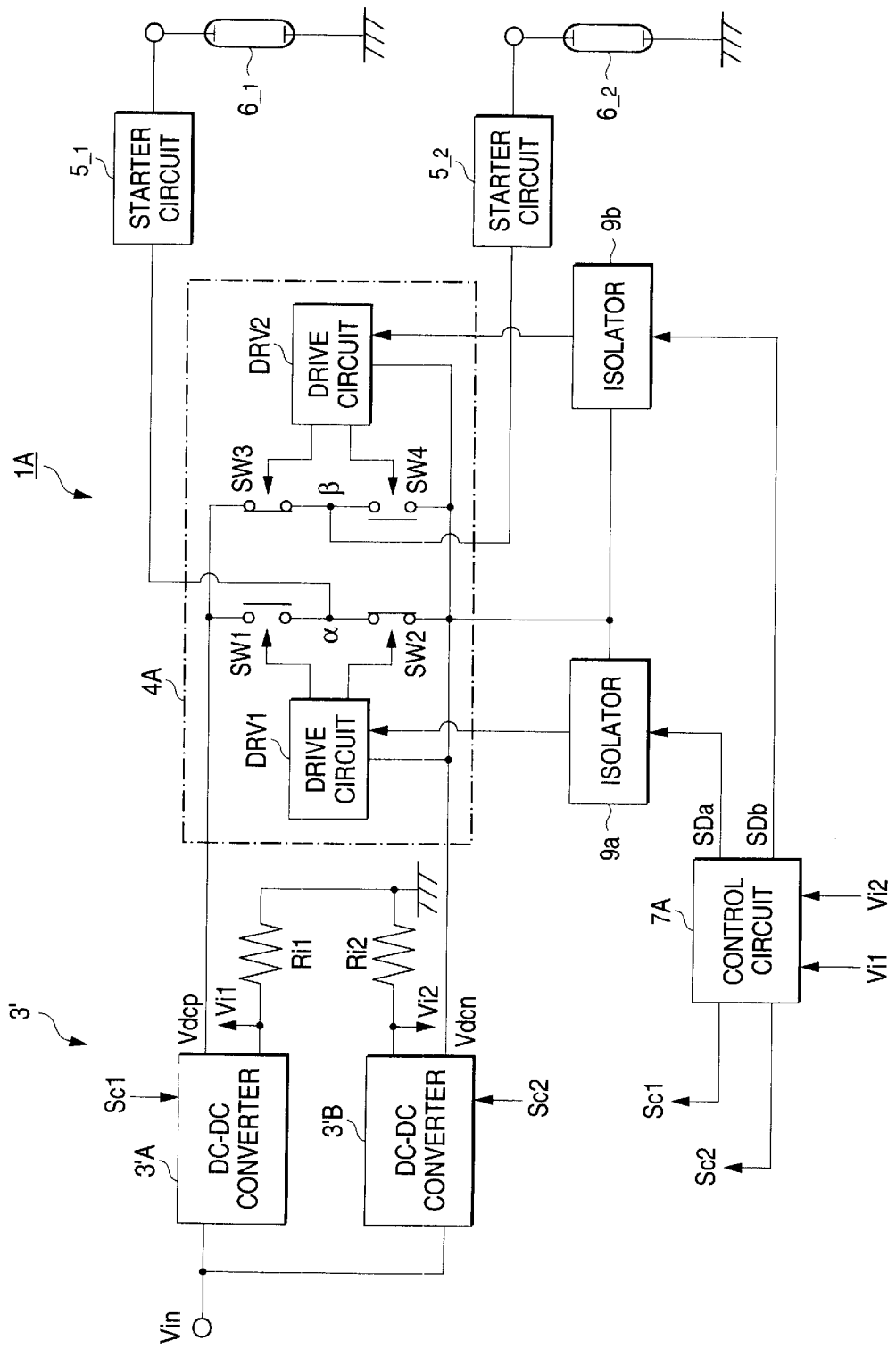
FIG. 7 is a diagram showing a circuit configuration example for lighting two discharge lamps.

To extend the circuit shown in FIG. 1 to a circuit capable of controlling lighting of two discharge lamps, for example, if the configuration shown in FIG. 3 is used as DC power supply circuit and a DC-AC conversion circuit 4A having a full-bridge type circuit configuration using four semiconductor switch elements is adopted as in a lighting circuit 1A shown in FIG. 7, thermal stress on the electrode of each discharge lamp introduces a problem.

In FIG. 7, elements sw1 and sw2 are connected in series as a first pair, and element sw1 is connected at one end to an output terminal of a DC-DC converter 3'A and is connected at an opposite end to an output terminal of a DC-DC converter 3'B via the switch element sw2. A first discharge lamp 6_1 is connected to a connection point α between the switch elements sw1 and sw2 via an inductive load in a starter circuit 5_1.

The switch elements sw3 and sw4 are connected in series as a second pair, and sw3 is connected at one end to the output terminal of the DC-DC converter 3'A and is connected at an opposite end to the output terminal of the DC-DC converter 3'B via the switch element sw4. A second discharge lamp 6_2 is connected to a connection point β between the switch elements sw3 and sw4 via an inductive load in a starter circuit 5_2.

The electrode terminals of the discharge lamps 6_1 and 6_2 that are not connected to the connection point α or β are grounded. If the current detection resistors Ri1 and Ri2 are not used, one end of each electrode may be grounded via a detection resistor in place of the Ri1 or Ri2.

A half-bridge driver IC is used as each of drive circuits DRV1 and DRV2 each for receiving a signal from a control circuit (7A) and defining the bridge polarity as described later.

In the DC-AC conversion circuit 4A, one drive circuit DRV1 controls turning on/off the switch elements sw1 and sw2 and the other drive circuit DRV2 controls turning on/off the switch elements sw3 and sw4. That is, assuming that the state of each switch element is defined so that the switch element sw1 is turned on and the switch element sw2 is turned off by the drive circuit DRV1 at one time, the state of each switch element is defined so that the switch element sw3 is turned off and the switch element sw4 is turned on by the drive circuit DRV2 at this time. Assuming that the state of each switch element is defined so that the switch element sw1 is turned off and the switch element sw2 is turned on by the drive circuit DRV1 at another time, the state of each switch element is defined so that the switch element sw3 is turned on and the switch element sw4 is turned off by the drive circuit DRV2 at this time. Thus, the switch elements sw1 and sw4 are switched on and off together and the switch elements sw2 and sw3 are switched on and off together, they alternately operate.

Therefore, the two pairs of switch elements are turned on and off, whereby while positive-polarity voltage is supplied to the first discharge lamp 6_1, for example, negative-polarity voltage is supplied to the second discharge lamp 6_2 (conversely, while negative-polarity voltage is supplied to the first discharge lamp 6_1, positive-polarity voltage is supplied to the second discharge lamp 6_2).

The control signals from the control circuit 7A, SDa and SDb (described later in detail), are sent through isolators 9a and 9b to the drive circuits DRV1 and DRV2. That is, in the example shown in FIG. 7, a low potential side voltage (ground potential) in each drive circuit is output voltage from the DC-DC converter 3'B for negative-polarity output. Thus isolation becomes necessary for defining H (high) and L (low) levels for the voltage and receiving the control signals (binary signals) and controlling turning the switch elements sw1 to sw4 on and off. Of course, if a bridge driver IC comprising an isolating function is used in each drive circuit, the control signals may be input directly to the drive circuits.

In the above-mentioned lighting circuit, the polarity of the voltage supplied to one of the two discharge lamps is positive, and switching control of the elements sw1 to sw4 is performed so that the polarity of the voltage supplied to the other discharge lamp becomes negative. Therefore, when one discharge lamp is already lighted, if the other discharge lamp is lighted, control of DC lighting for this discharge lamp is also performed for the discharge lamp already lighted. Thus, although this discharge lamp is lighted in a stable state, it enters a long DC lighting period from this state and the load on the electrode (thermal stress) is increased.

To solve this problem, in addition to determining the duration of the DC lighting period simply by obtaining the product of the current and time, preferably a time limit means is provided for limiting the duration so as not to continue exceeding the upper limit value. For example, a circuit shown in FIG. 8 can be used.

Figure 8:
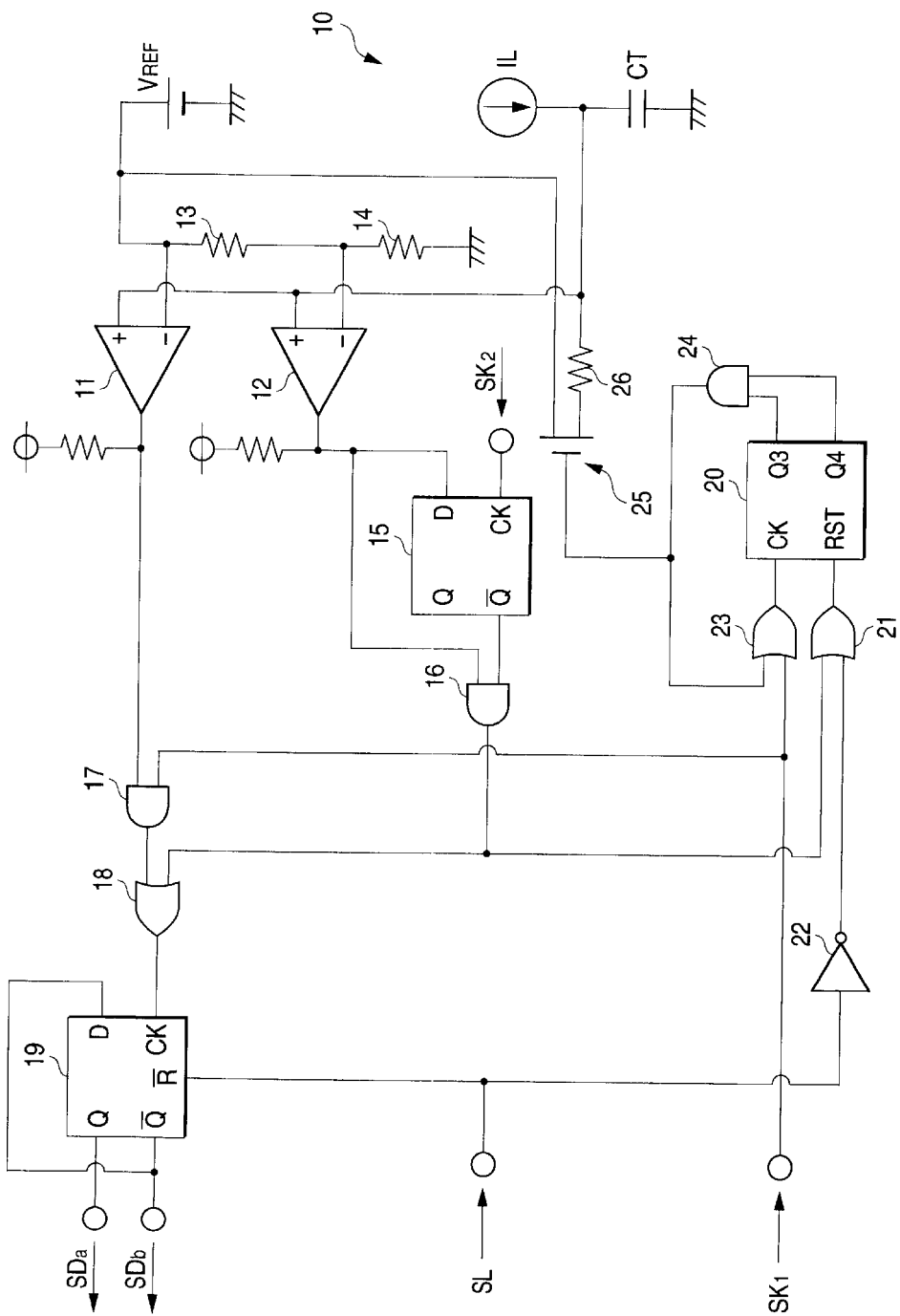
FIG. 8 is a circuit diagram showing a circuit configuration example for control to limit the duration of DC lighting.

FIG. 8 shows a configuration example 10 of the main part of a generation portion of the control signal sent to the drive circuit (DRV1, DRV2) in the control circuit 7A (the portion concerning only one discharge lamp is shown).

Two comparators 11 and 12 are provided for comparing the terminal voltage of a capacitor CT charged by a current detection signal, indicating the current flowing into the discharge lamp (in the figure, to represent the signal as a current value, the signal is indicated by a current source symbol and the current value is represented as IL), with a predetermined reference voltage.

One comparator 11 has a positive input terminal connected to one end of the capacitor CT and a negative input terminal connected to the predetermined reference voltage (in the figure, the voltage is indicated by a constant-voltage source symbol and the voltage value is represented as VREF). The other comparator 12 has a positive input terminal connected to one end of the capacitor CT and a negative input terminal connected via a resistor 13 to the voltage source VREF and grounded via a resistor 14. The resistors 13 and 14 are equal in resistance value.

A D flip-flop 15 is placed at the output stage of the comparator 12 and an output signal of the comparator 12 is supplied to a D input terminal of the D flip-flop 15. A clock signal (SK2) from a signal generation circuit (not shown) is supplied to a clock signal input terminal (CK) of the D flip-flop 15.

A signal from a Q bar output terminal (indicated by a bar symbol on the Q in the figure) is supplied to one input terminal of a two-input AND gate 16 and the output signal from the comparator 12 is supplied to the other input terminal of the AND gate 16.

An output signal of the comparator 11 is sent to one input terminal of a two-input AND gate 17 and a clock signal (SK1) from the signal generation circuit (not shown) is supplied to the other input terminal of the AND gate 17. Output signals of the AND gates 17 and 16 are sent to a two-input OR gate 18 and an output signal of the OR gate 18 is supplied to a clock signal input terminal (CK) of a D flip-flop 19.

The D flip-flop 19 outputs a signal as a control signal to the drive signal DRV1, DRV2 and has a D input terminal connected to a Q bar output terminal, and a signal provided from the terminal becomes a control signal SDb. A signal provided from a Q terminal of the D flip-flop 19 becomes a control signal SDa. The D flip-flop 19 has a reset terminal of active low input (indicated by a bar symbol on the R in the figure) and a state determination signal SL (when the signal is high, it means that the discharge lamp is lighted; when the signal is low, it means that the discharge lamp is extinguished) is supplied to the reset terminal from a light state determination circuit (not shown), such as a circuit for determining whether or not the discharge lamp is lighted by comparing a detection current value with a predetermined reference value by a comparator placed at the stage following the circuit shown in FIG. 5, for example.

An output signal of the AND gate 16 is supplied via a two-input OR gate 21 and on to a reset terminal (RST) of a binary counter 20 shown below the D flip-flop 15. The state determination signal SL is supplied via a NOT gate 22 as the other input of the OR gate 21. The clock signal SK1 is supplied via a two-input OR gate 23 to a clock signal input terminal (CK) of the counter 20. Signals provided from output terminals Q3 and Q4 of the counter 20 (when the index indicating the stage level is i, Qi denotes the ith-stage output terminal) are sent to a two-input AND gate 24.

An output signal of the two-input AND gate 24 is sent to the OR gate 23 and a control terminal (gate if an FET is applied) of an analog switch element 25 (in the figure, semiconductor elements are indicated by a simplified symbol so that any semiconductor element can be used regardless of whether an element is a bipolar element, a unipolar element, etc.,).

The analog switch element 25 has one non-control terminal to which the predetermined voltage VREF is supplied, and the other non-control terminal connected to one end of the capacitor CT and to the positive input terminals of the comparators 11 and 12 via a resistor 26.

The frequency of the clock signal SK1 is about 500 Hz, for example, and the frequency of the clock signal SK2 may be set to a sufficiently high frequency (several tens of kilohertz) as compared with the lighting frequency of the discharge lamp.

Figure 9:
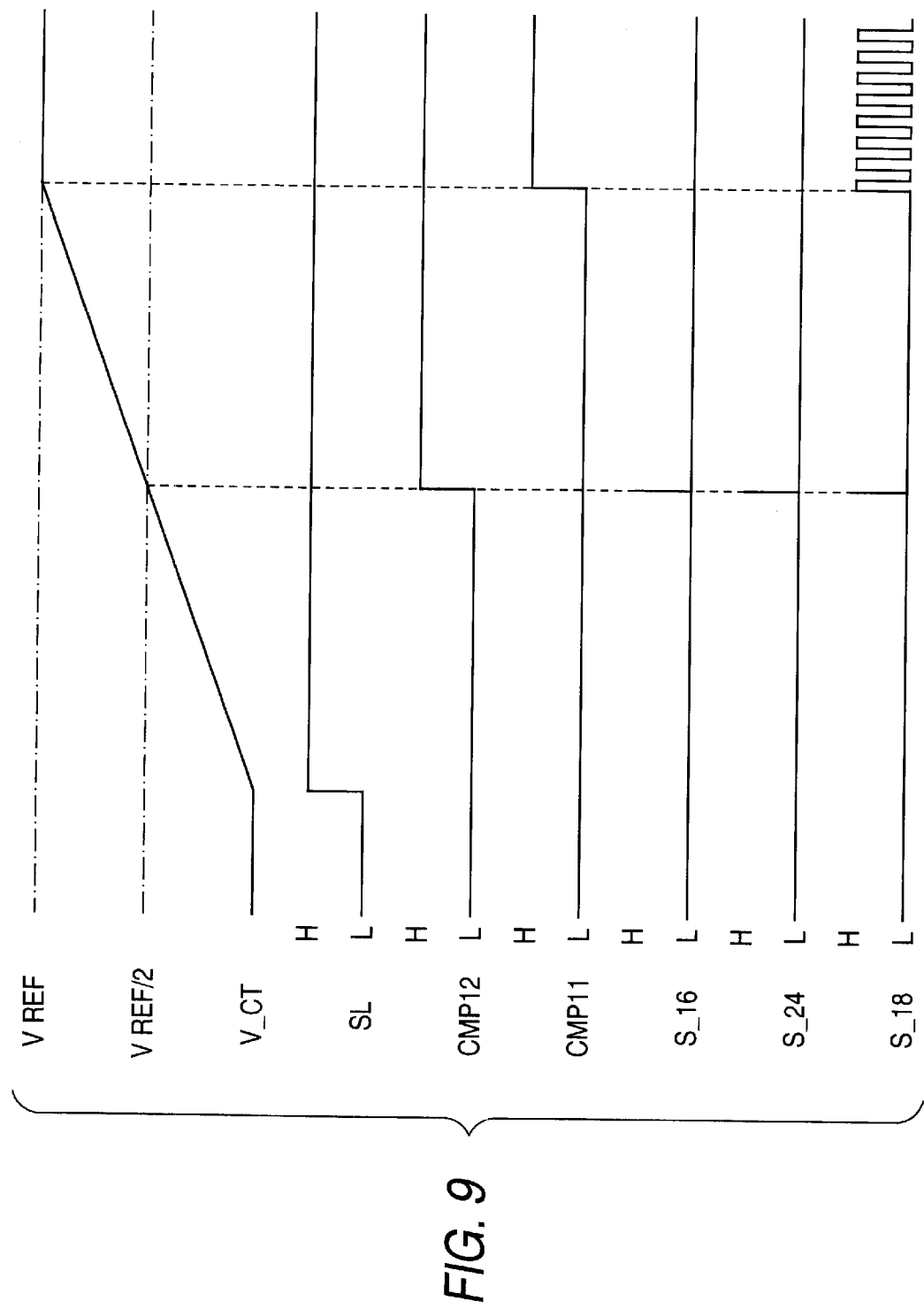
FIG. 9 is a drawing illustrating the operation of the circuit shown in FIG. 8 concerning the situation in which no time limit is placed on the duration of DC lighting.
Figure 10:
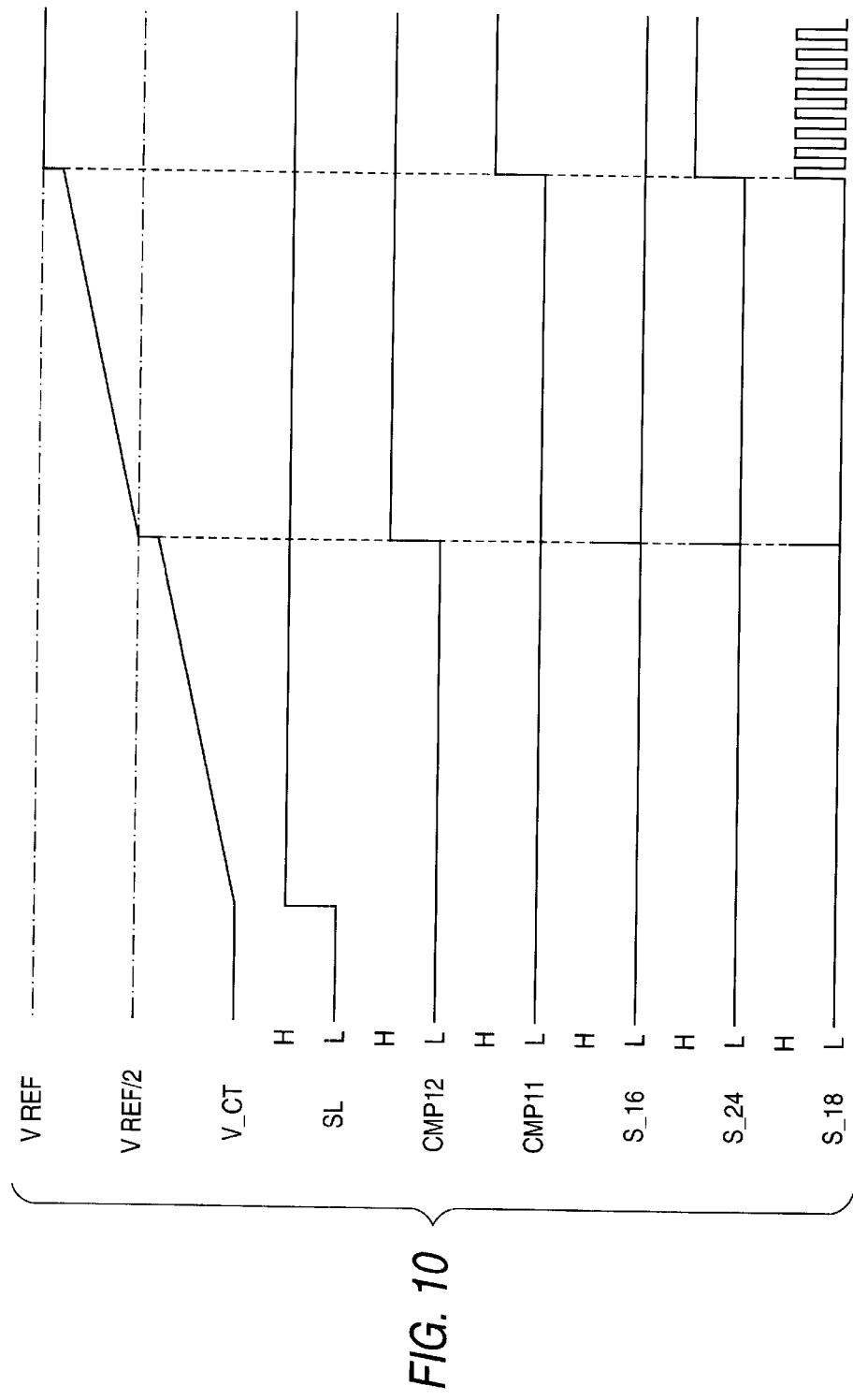
FIG. 10 is a illustrating the operation of the circuit shown in FIG. 8 concerning the situation in which time limit is placed on the duration of DC lighting.

FIGS. 9 and 10 show main signal waveforms in the circuit and the meanings of the signals are as follows:

VREF/2: Half of the level indicated by reference voltage VREF

V_CT: Terminal potential of capacitor CT

CMP12: Output signal of comparator 12

CMP11: Output signal of comparator 11

S_16: Output signal of AND gate 16

S_24: Output signal of AND gate 24

S_18: Output signal of OR gate 18

The signal SL is as previously described and in the figure, H means high and L means low.

In the circuit 10 of FIG. 8, the time until the capacitor CT is charged and the terminal voltage of the capacitor CT reaches VREF corresponds to the time of DC lighting. The larger the current detection value related to the discharge lamp, the shorter the charge time of the capacitor CT. The durations of Tdcf and Tdcr are shortened accordingly.

FIG. 9 shows the operation state of the circuit when a time limit is not placed on the duration of DC lighting (namely, when the duration of DC lighting determined from the current detection value of the discharge lamp is less than the upper limit value).

When the discharge lamp to be lighted is extinguished, the state determination signal SL is low and thus the D flip-flop 19 is reset and the Q output signal thereof is low. The state determination signal SL is inverted high through the NOT gate 22 and the high signal is supplied to the reset terminal RST of the counter 20 for resetting the counter 20. Thus, the AND gate 24 positioned at the stage following the counter 20 outputs a low signal and therefore the analog switch element 25 is off.

Then, when the discharge lamp is lighted, the state determination signal SL makes a low-to-high transition, resetting the D flip-flop 19 is released, and a clock input wait state is entered. At the same time, the terminal voltage of the capacitor CT starts to rise. When the terminal voltage reaches VREF/2, the comparator 12 outputs a high signal and the AND gate 16 outputs a high pulse, whereby the counter 20 is reset and at the same time, the output signal of the D flip-flop is inverted. This means that the time interval between the instant at which the discharge lamp is lighted and the instant at which the output of the D flip-flop is inverted corresponds to the first-half period Tdcf mentioned above.

When the terminal voltage of the capacitor CT further rises and then finally reaches VREF, the comparator 11 outputs a high signal at that point in time. Thus, the ANDing result signal of the signal with the clock signal SK1 is supplied through the OR gate 18 to the clock signal input terminal of the D flip-flop 19, so that division outputs by two (frequency 250 Hz) are provided as signals SDa and SDb through the D flip-flop 19. The time interval between when "V_CT=VREF/2" and when "V_CT=VREF" corresponds to the latter-half period Tdcr mentioned above.

When the signal from the NOT gate 22 is low (namely, the signal SL is high) and the output signal of the AND gate 16 is low, resetting of the counter 20 is released and the counter 20 starts a count-up operation upon reception of the signal SK1. Then, the AND gate 24 outputs a high signal after the expiration of the reference time determined by the Q3 output signal and the Q4 output signal (in the example, 24 mS), and the high signal is sent to the OR gate 23 which ends the count-up operation.

FIG. 10 shows the operation state of the circuit when the time limit is placed on the duration of DC lighting (when the duration of DC lighting determined from the current detection value of the discharge lamp is equal to or greater than the upper limit value).

In this case, after the discharge lamp is lighted, the degree of a rise in the terminal voltage of the capacitor CT is small because the detection current value is small. Thus, it takes time until the terminal voltage reaches VREF/2. When the above-mentioned reference time has elapsed, the ANG gate 24 (see FIG. 8) outputs a high signal and thus the analog switch element 25 is turned on, whereby the capacitor CT is connected via the resistor 26 to the voltage source of VREF, so that the terminal voltage V_CT rises in one stroke. When the terminal voltage reaches VREF/2, the comparator 12 outputs a high signal. Therefore, the counter 20 is reset and the inversion operation of the D flip-flop 19 is performed in a similar manner to that described above.

When the terminal voltage V_CT again rises gradually after the output signal of the AND gate 24 goes low, and the reference time has elapsed, the ANG gate 24 outputs a high signal and thus the analog switch element 25 is turned on, whereby the terminal voltage V_CT again rises in one stroke. When V_CT reaches VREF, the comparator 11 outputs a high signal. Therefore, division outputs are provided as signals SDa and SDb through the D flip-flop 19 as described above.

In the circuit, the counter 20 is provided as a reference time count means to limit the durations of Tdcf and Tdcr within the predetermined reference time. When the reference time has elapsed, the capacitor CT is forcibly charged through the analog switch element 25, thereby forming a time limit means (including components 20, 25, and 26). Thus, a time limit function is exerted so that the duration of DC lighting (Tdcf, Tdcr) is not continued longer than necessary if the current detection value related to the discharge lamp is small.

Therefore, a time limit is also placed on the time of maintaining the switch element on in the bootstrap type circuit as shown in FIG. 4, so that the capacitance of the capacitor need not be increased.

In a lighting circuit for two discharge lamps, if one discharge lamp is already lighted when the other discharge lamp is lighted, a time limit is also placed on the DC lighting duration for the discharge lamp already lighted, so that the thermal stress on the electrode can be suppressed.

The setup value of the reference time (limit time) should be determined by considering the effect of the reference time on the life and the lighting performance of each discharge lamp. That is, if a reference time is set to a duration longer than necessary, the life of the discharge lamp already lighted may be shortened, and the capacitance of a bootstrap capacitor must be increased. Conversely, if the reference time is set too short, lighting performance may be degraded. Thus, the reference time may be determined by considering both the factors. In the example, the reference time values of Tdcf and Tdcr are set to equal values of simplifying the circuit configuration. However, the reference time values of Tdcf and Tdcr may be set to different values.

As seen from the description made above, the duration of the DC lighting according to the invention is determined by the time it takes for the product of the time and the value of current flowing into the discharge lamp to equal a predetermined value. For example, when the current value of the discharge lamp is large, the duration of the DC lighting is shortened; when the current value is small, the duration is prolonged. Therefore, the stability of lighting can be guaranteed as compared with the case where the duration of the DC lighting is set independently of the state of the discharge lamp. Further, short life and degradation of the discharge lamp caused by a longer than necessary continuation of the DC lighting period can be prevented.

According to another aspect of the invention, the duration of the DC lighting may be limited so as not to continue exceeding an upper limit value. Thus, short life of the discharge lamp is prevented and the cost of the circuit required for maintaining DC lighting can be reduced.

In another aspect of to the invention, two discharge lamps can be lighted by the common lighting circuit. The duration of DC lighting can be defined in response to the state of each discharge lamp. The duration is limited, whereby when one discharge lamp is lighted and the other discharge lamp already lighted, DC lighting is not continued over a long time longer than necessary for the discharge lamp already lighted, so that an excessive thermal stress will not be placed on the discharge lamp electrode.

What is claimed is:

1. A discharge lamp lighting circuit comprising:
   a DC power supply circuit for outputting a DC voltage,
   a DC-AC conversion circuit for converting the output voltage of the DC power supply circuit into an AC voltage and then supplying the AC voltage to a discharge lamp, and
   a current detection circuit for detecting an electric current flowing into the discharge lamp, wherein just after the discharge lamp is lighted, an output frequency of the DC-AC conversion circuit is temporarily changed for defining a lighting frequency of the discharge lamp as a low frequency, to perform DC lighting over a predetermined time, wherein the duration of the DC lighting is determined by the time it takes for the product of a time value and a value of current flowing into the discharge lamp to equal a predetermined value.

2. The discharge lamp lighting circuit as claimed in claim 1 further comprising a time limit means for limiting the duration of DC lighting.

3. The discharge lamp lighting circuit as claimed in claim 1 wherein said DC power supply circuit comprises a first circuit section for outputting a positive-polarity voltage and a second circuit section for generating a negative-polarity voltage and two discharge lamps are connected to output terminals of said DC-AC conversion circuit at the stage following said DC-AC conversion circuit.

4. The discharge lamp lighting circuit as claimed in claim 3, wherein the positive-polarity and negative-polarity voltages output from the circuit sections of said DC power supply circuit are sent to said DC-AC conversion circuit and wherein a plurality of switch elements are included in said DC-AC conversion circuit for switching the output voltages, the switches operated alternately by drive circuits of the switch elements, and wherein AC voltages generated by the alternation operation are supplied to the discharge lamps.

5. The discharge lamp lighting circuit of claim 4, wherein the first discharge lamp is connected to a connection point of the switch elements connected in series as a first pair, and the second discharge lamp is connected to a connection point of the switch elements connected in series as a second pair.

6. The discharge lamp lighting circuit of claim 4, wherein the switch elements are turned on and off, whereby while positive-polarity voltage is supplied to the first discharge lamp, a negative-polarity voltage is supplied to the second discharge lamp, and conversely, while negative-polarity voltage is supplied to the first discharge lamp, a positive-polarity voltage is supplied to the second discharge lamp.

7. The discharge lamp lighting circuit of claim 1, wherein said duration of the DC lighting is divided into a first half in that a first voltage is applied to the discharge lamp, and a second half in that a second voltage different from the first voltage is applied to the discharge lamp.

8. A method for controlling a discharge lamp comprising:

illuminating the discharge lamp; and adjusting the output frequency of a DC-AC conversion circuit to define the lighting frequency of the discharge lamp as a low frequency to perform DC lighting for a predetermined time just after the discharge lamp is lighted, wherein a DC lighting duration is determined by multiplying the value of the current flowing into the discharge lamp with a time value to equal the predetermined time.

* * * * *